United States Patent
Narasimhan et al.

(10) Patent No.: US 10,359,277 B2
(45) Date of Patent: Jul. 23, 2019

(54) IMAGING SYSTEM WITH SYNCHRONIZED DYNAMIC CONTROL OF DIRECTABLE BEAM LIGHT SOURCE AND RECONFIGURABLY MASKED PHOTO-SENSOR

(71) Applicants: CARNEGIE MELLON UNIVERSITY, Pittsburgh, PA (US); THE GOVERNING COUNCIL OF THE UNIVERSITY OF TORONTO, Toronto (CA)

(72) Inventors: Srinivasa Narasimhan, McDonald, PA (US); Supreeth Achar, Seattle, WA (US); Matthew O'Toole, Palo Alto (CA); Kiriakos Neoklis Kutulakos, Toronto (CA)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 54 days.

(21) Appl. No.: 15/545,391

(22) PCT Filed: Feb. 15, 2016

(86) PCT No.: PCT/US2016/017942
§ 371 (c)(1),
(2) Date: Jul. 21, 2017

(87) PCT Pub. No.: WO2016/131036
PCT Pub. Date: Aug. 18, 2016

(65) Prior Publication Data
US 2018/0094919 A1    Apr. 5, 2018

Related U.S. Application Data

(60) Provisional application No. 62/176,352, filed on Feb. 13, 2015.

(51) Int. Cl.
*G01B 11/25* (2006.01)
*H04N 13/254* (2018.01)
(Continued)

(52) U.S. Cl.
CPC ...... *G01B 11/2518* (2013.01); *G01B 11/2513* (2013.01); *G03B 21/2033* (2013.01);
(Continued)

(58) Field of Classification Search
CPC ............ G01B 11/2513; G01B 11/2518; H04N 13/254; H04N 9/3129; H04N 5/30;
(Continued)

(56) References Cited

U.S. PATENT DOCUMENTS

2010/0128221 A1    5/2010  Muller et al.
2012/0200829 A1*   8/2012  Bronstein .......... G02B 27/2271
                                                        353/7
(Continued)

OTHER PUBLICATIONS

International Search Report dated May 19, 2016 for International Patent Application No. PCT/US16/17942.
(Continued)

*Primary Examiner* — Yon J Couso

(57) ABSTRACT

An energy optimized imaging system that includes a light source that has the ability to illuminate specific pixels in a scene, and a sensor that has the ability to capture light with specific pixels of its sensor matrix, temporally synchronized such that the sensor captures light only when the light source is illuminating pixels in the scene.

21 Claims, 4 Drawing Sheets

(51) Int. Cl.
*H04N 13/398* (2018.01)
*G03B 21/20* (2006.01)
*G06T 17/00* (2006.01)
*H04N 5/30* (2006.01)
*H04N 9/31* (2006.01)

(52) U.S. Cl.
CPC ............... *G06T 17/00* (2013.01); *H04N 5/30* (2013.01); *H04N 9/3129* (2013.01); *H04N 13/254* (2018.05); *H04N 13/398* (2018.05)

(58) Field of Classification Search
CPC .. H04N 13/398; H04N 5/2258; H04N 5/2625; H04N 5/353; H04N 5/3535; G03B 21/2033; G06T 17/00
See application file for complete search history.

(56) References Cited

U.S. PATENT DOCUMENTS

| | | |
|---|---|---|
| 2013/0021474 A1 | 1/2013 | Taylor et al. |
| 2013/0127854 A1 | 5/2013 | Shpunt et al. |
| 2014/0111616 A1* | 4/2014 | Blayvas ............. G01B 11/2513 348/46 |

OTHER PUBLICATIONS

O'Toole et al. "3D Shape and Indirect Appearance by Structured Light Transport." University of Toronto. 2014 (2014), pp. 1-3, 6-7 [on line] <URL: http://www.cs.toronto.edu/-kyros/pubs/14.cvpr.slt.pdf>.

O'Toole et al. "Prima-Dual Coding to Probe Light Transport." ACM. 2012 (2012), pp. 39:1-39:6 [online] <URL:http://www.cs.toronto.edu/-kyros/pubs/12.sig.pdc.pdf>.

* cited by examiner (a) Epipolar Component　　　　(b) Non-Epipolar Component

IMAGING SYSTEM WITH SYNCHRONIZED DYNAMIC CONTROL OF DIRECTABLE BEAM LIGHT SOURCE AND RECONFIGURABLY MASKED PHOTO-SENSOR

CROSS-REFERENCE TO RELATED APPLICATIONS

This application is a national phase claiming the benefit of and priority to International Patent Application No. PCT/US2016/017942, entitled "IMAGING SYSTEM WITH SYNCHRONIZED DYNAMIC CONTROL OF DIRECTABLE BEAM LIGHT SOURCE AND RECONFIGURABLY MASKED PHOTO-SENSOR," filed Feb. 15, 2016, which claims priority to Provisional U.S. Patent Application No. 62/176,352 filed Feb. 13, 2015, which are hereby incorporated by reference in their entireties.

RELATED APPLICATIONS

This application claims the benefit of U.S. Provisional Patent Application No. 62/176,352, files Feb. 13, 2015

GOVERNMENT RIGHTS

This invention was made with government support under National Science Foundation No. IIS1317749 and Army/ARO No. W911NF-10-2-0016. The government has certain rights in this invention.

BACKGROUND OF THE INVENTION

When an image is captured under controlled lighting, the power of the light source has great impact on the result. All things being equal, brighter sources will send more photons to the sensor during an exposure, producing a brighter and less noisy image.

The brightness of the source, however, is just one way to control the amount of light that reaches the sensor of a computational imaging system. Modern systems use an arrangement of devices to transport light from a source to the scene (or from the scene to sensor) and these devices (galvanometers, digital micro-mirror devices, liquid-crystal panels, phase modulators, etc.) are often programmable. However, these devices in the currently used configurations are also inefficient in their power consumption.

Studies of this problem began in the 1960s for arrangements of just the three main active components; a light source, a controllable light-blocking mask, and a photo-sensor. In this ubiquitous configuration, the light source is always turned on, and, while the energy efficiency of light sources have greatly increased over time, having the light source always turned on is still a major source of power consumption. The controllable light-blocking mask is used to selectively light the scene to be captured by the photo-sensor. This practice is not energy efficient, however, due to the fact that photons that are being generated are simply blocked within the system.

SUMMARY OF THE INVENTION

This invention introduces an energy optimized imaging system that captures images using one or more directable beam light sources synchronized with one or more active pixel selectable photosensors.

By synchronizing control of both a light source that has the ability to illuminate a specific area(s) along with a photosensor having a configurable mask having the ability to mask specific pixels, this invention can perform numerous imaging techniques that are either not possible with current technology, or are possible with current technology but would require far more optical components, far more expense, far more computation, and/or far more power consumption.

This invention can demonstrate several never-seen-before capabilities. For instance, live structured-light video of very bright scenes can be captured, even, for example, a light bulb that is on. The invention can also capture epipolar-only and indirect-only live video with optimal energy efficiency. The invention can measure the 3D shape of objects in challenging conditions, such as strong indirect light, strong ambient light, and smoke while using a low-power projector as the light source. Also, the invention can record live video from the point of view of a projector, rather than a photo-sensor.

BRIEF DESCRIPTION OF THE DRAWINGS

FIG. 2(a) is a representation of the low end of the efficiency spectrum, where the light source is always on, blocked with mask p. FIG. 2(b) represents the most efficient projector, able to concentrate all the energy of the light source to just one pixel.

FIG. 4(a) shows the epipolar component of an image of an object, while FIG. 4(b) shows the non-epipolar component of an image of the same object.

DETAILED DESCRIPTION OF THE INVENTION

A widely known truth in the field of image capture is that to optimally capture images with the most detail and least noise, the light throughput between the light source and the photosensor must be optimized. This invention implements this maxim while at the same time allowing for selective blocking of light paths between the light source and photo-sensor. The system topology that results from this optimization also allows for never-seen-before imaging techniques and energy efficiency.

Figure 1:
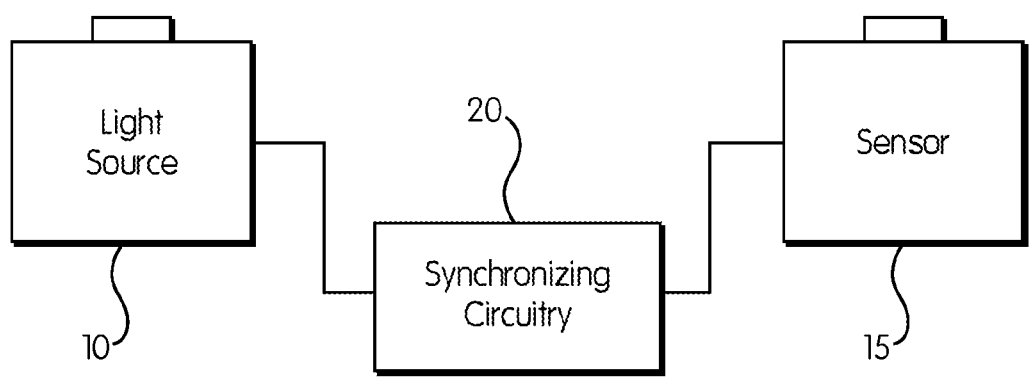
FIG. 1 shows a functional block diagram of the imaging system.

There are three main parts to the invention as currently implemented, interconnected as shown in FIG. 1: a directable light source 10, a sensor 15 and, crucial to this invention, a synchronizing controller 20 that synchronizes the active region of sensor 15 to the beam direction of light source 10 in accordance with an optimizing equation, discussed below.

As used herein, the term "directable light source" is a controllable light source that emits different amounts of light in different directions, where each pixel in the projector corresponds to a direction along which a slightly diverging beam is emitted. By changing the amount of light emitted along each direction, the projected pattern can be changed. There are two broad classes of projectors, spatial light modulator (SLM) based projectors and scanning projectors.

Figure 2:
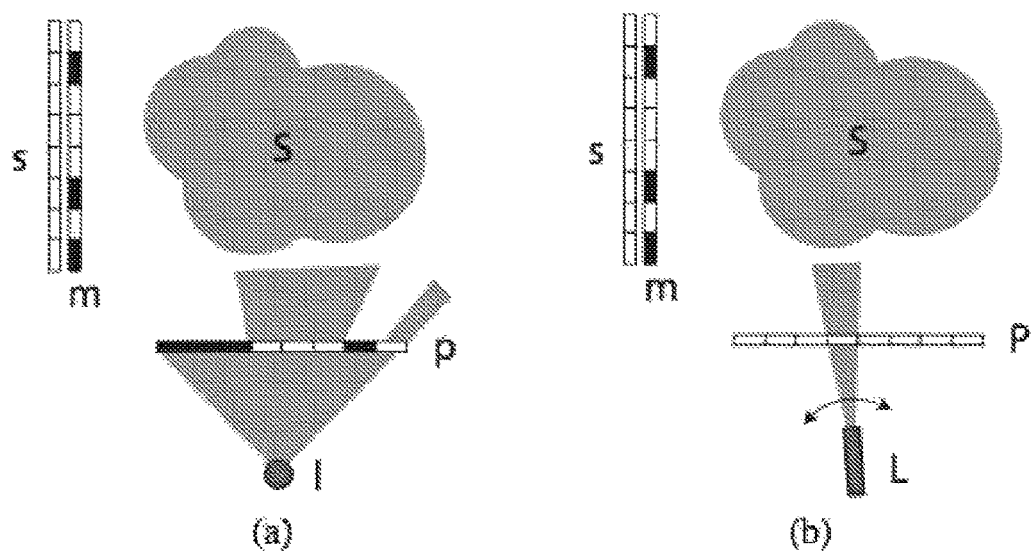
FIG. 2 illustrates the extremes of projector technologies.

SLM projectors are of the type shown in FIG. 2(a), and consists of a 2D array of controllable elements, one element for each pixel. Depending on the type of SLM, the elements can be controlled to either block/reflect light (a digital micro-mirror device (DMD)) or block/transmit light (liquid crystal display (LCD) or liquid crystal on silicon (LCoS)). The projector has a light source inside along with optics to focus that light onto the entire field of the SLM. By controlling the SLM elements, one can change the spatial light pattern the projector sends out. In the equations shown herein, these projectors have σ=N, where N is the number of pixels. This type of projector is very inefficient when projecting patterns where only a small number of pixels are illuminated (a pattern containing a single line for instance) because most of the light needs to be blocked by the SLM to create the pattern.

Scanning projectors are of the type shown in FIG. 2(b) and internally have a light source, some optics that focuses the light into a narrow beam and a some type of controllable mirror that deflects the beam. By rapidly changing the mirror deflection and simultaneously modulating the light power of the internal source, the projector is able to 'draw' a spatial pattern. With this type of projector only one direction (or pixel) is being illuminated at any point of time, but this direction changes very quickly. In the projector used in the preferred embodiment of the invention, the mirror deflects the beam along a rasterized path (i.e., scans across one row at a time and proceeds row-by-row). This is a raster scanning laser projector. In the equations shown herein, scanning projectors can be thought of as projectors with σ=1. This type of projector is efficient when projecting patterns where only a small number of pixels are illuminated.

As used herein, the terms "light source", "directable light source" and "projector" are used interchangeably.

Also, in the preferred embodiments of the invention, various types of sensors may be used. Phase measuring light sensors (example photonic mixing devices or PMDs) can be used for measuring distance based on continuous wave time-of-flight; Dynamic vision Sensors (DVS) are sensors that are sensitive to changes in light levels; and photodiode arrays and avalanche photodiode arrays are high speed, high sensitivity light sensors that are often used for impulse time-of-flight measurements (flash LIDARS). In addition, basic CMOS and CCD sensors may be used.

In the preferred embodiment of the invention, a scanning projector of the type using a LASER-based projector with a beam steering mechanism, for example, a MEMS mirror, is used as the directable light source, and the sensor is preferably a light sensitive photosensor with a rolling shutter.

With reference to FIG. 1, light source 10 can be controlled to illuminate a specific point, line, or area of a scene to be imaged. Sensor 15 contains a grid of light-sensitive pixels. In a preferred embodiment, the rolling shutter of the photosensor captures an image by rapidly scanning the scene one row (or column) of pixels at a time. By synchronizing these, at any point of time, the light can selectively illuminate just the part of the scene that will be scanned by the photo-sensor. This optimizes the energy required to image the scene. The goal of the invention is to maximize the total energy that can be transmitted from individual projector pixels to individual sensor pixels.

The mathematical framework for this energy-optimized imaging system follows. If light source 10 is always on, and emits at the constant rate of Φ watts, illuminating a scene for exposure time T means that the total energy generated by light source 10 is ΦT.

The illumination vector l is used to describe how the total energy of a projector is distributed over N individual pixels. In particular, each element of l measures the total energy emitted by the source through a specific projector pixel during the exposure time. The $l_1$-norm of l is therefore equal to the total "useful" energy of the source, i.e., the energy actually used for scene illumination. This energy cannot be larger than the energy generated by the source:

$$0 \leq l, \|l\|_1 \leq \Phi T$$

where $\|\ \|_1$ is the $l_1$-norm, giving the sum of all elements of a vector.

The energy efficiency of a projector depends critically on its ability to direct a maximum amount of the energy generated by the light source 10 to individual pixels. This ability is expressed as an upper bound on the individual elements of l:

$$\|l\|_\infty \leq \Phi T/\sigma$$

where σ is a projector-specific parameter defined as the spatial spread. This parameter takes values between 1 and N and models energy redistribution. The larger its value, the lower the energy that can be sent through any one pixel, and the more energy wasted when projecting a pattern with just few pixels turned on.

The specific value of σ depends on the projection technology. At the far end of the range, with σ=N, are conventional projectors, as shown in FIG. 2(a). These projectors use mirrors and lenses to distribute light evenly over a spatial light modulator, which may then block all or part of the light. The near end of the range, with σ=1, represents an idealized projector that is perfectly efficient, as shown in FIG. 2(b). This projector can send all its light through just one pixel for the entire exposure time T but can also distribute it, without any blocking, according to an arbitrary illumination l.

The $l_1$ and $l_\infty$ constraints on l can be written more concisely as $$0 \leq l, \|l\|_{\dagger\sigma} = \max\left(\frac{\sigma\|l\|_\infty}{\Phi}, \frac{\|l\|_1}{\Phi}\right) \leq T$$

where $\|\cdot\|_{\dagger\sigma}$ is the max of two norms and therefore also a norm. These constraints are useful in three ways. First, arrangements can be optimized with very different light redistribution properties by adjusting the spatial spread parameter. Second, the dependence on exposure time makes a distinction between systems that conserve energy and those that merely conserve power. Third, they explicitly account for timescale-dependent behavior, for example raster-scan laser projectors can act like a beam, light sheet, or point source depending on T.

For masks that can control light attenuation at individual pixels on a sensor, we consider mask m, which is bounded from 0 to 1. The combined effect of the mask and illumination pattern can be represented as the outer product matrix of two vectors:

$$\Pi = ml^T$$

Intuitively, matrix Π can be thought of as defining a non-uniform spatial light distribution that concentrates energy usable for imaging in some parts of space and not in others. Energy utilization is maximized when both the illumination pattern and the mask reach their norm upper bounds, $\|m\|_\infty \|l\|_{\dagger\sigma}$.

It is also possible to use more than one mask and illumination pattern for the frame exposure time. Suppose for instance that K masks and illuminations were used. The optimization equation could then be written as:

$$\Pi = [\underbrace{m_1\ m_2\ \ldots\ m_K}_{\text{masks } M}][\underbrace{l_1\ l_2\ \ldots\ l_K}_{\text{illuminations } L}]^T$$

There may be sequences that distribute light exactly like M and L but with greater total energy. Finding the most energy-efficient sequences requires solving a homogeneous factorization problem, where the goal is to produce a matrix H with the largest possible scale factor:

$$\max_{\gamma, M, L, t_1, \ldots, t_K} \gamma$$

subject to $\gamma \Pi = ML^T$ $0 \leq m_k, \|m_k\|_\infty \leq 1$ $0 \leq l_k, \|l_k\|_{\dagger\sigma} \leq t_k$ $0 \leq t_k, \sum_{k=1}^{K} t_k \leq T$ The optimization equations above are hard to solve directly. But the equation can be relaxed into the following form:

$$\min_{M,L} \|\Pi - ML^T\|_F^2 + \lambda \sum_{k=1}^{K} \|m_k\|_\infty \|l_k\|_{\dagger\sigma}$$

subject to $0 \leq m_k, 0 \leq l_k$ where λ is a regularization parameter that balances energy efficiency and the reproduction of Π. This allows for finding M & L that will saturate their upper-bound constraints, and hence a fully illuminated matrix Π.

Figure 3:
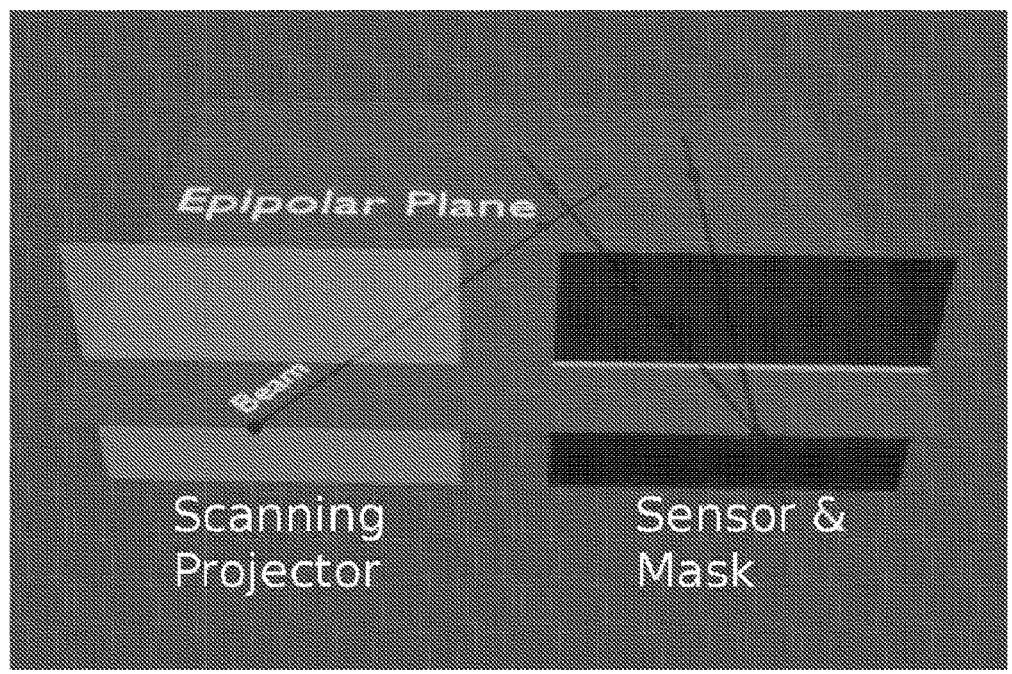
FIG. 3 illustrates the preferred embodiment of the invention wherein a light source and a sensor are arranged in a rectified stereo configuration.
Figure 4:
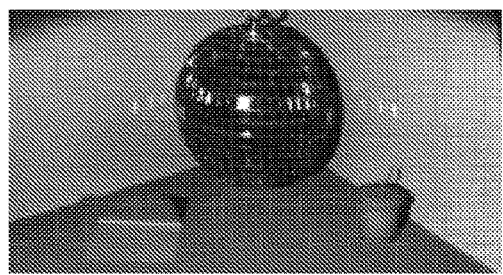
Figure 4:
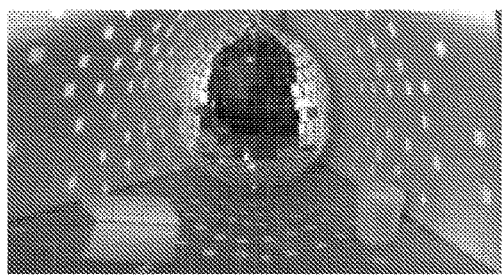

Illumination codes that maximize the energy efficiency are the impulse illuminations, like those of FIG. 2(b). This is replicated in the invention by the use of the a LASER-based projector, preferably an ultra-low power LASER, with a MEMS mirror to provide beam steering as depicted in FIG. 1 as light source 10. In this embodiment, the light source and the sensor must be configured using a rectified stereo configuration, as shown in FIG. 3. To capture the epipolar component, as shown in FIG. 4(a), the sensor masks are ideally chosen such that for each projector scan line, only the corresponding row in the sensor is exposed. In reality, a single illuminated line in the projector may be mapped to multiple lines in the sensor. This blocks all light that does not satisfy the constraint between the projector and sensor. The masks can be implemented easily using the rolling shutter setup by placing the projector and sensor in an approximate stereo configuration such that their optical axes are parallel to each other, perpendicular to the baseline and the scanlines of the projector and rows of the sensor are parallel to the baseline. In this configuration, the epipolar lines between the projector and sensor are horizontal lines. For any projector scanline the row of pixels in the sensor image along which the corresponding points must lie can be identified.

To capture the epipolar component, the exposure $t_e$ for each sensor row is matched to the time the projector stays on a scanline ($t_p$) and the other timing parameters are chosen so that the line scanned by the projector is synchronized to the row being exposed in the sensor. Conversely, to capture non-epipolar light, the sensor exposure time is set to be $t_p$ less than the projector cycle time and the trigger is offset by $t_p$ so that every row is exposed for the entire projector cycle except during the time it is illuminated directly by the projector.

This energy optimized imaging system also has unique capabilities that are not possible in other imaging systems.

Because the rolling shutter of sensor 15 is tuned by synchronization controller 20 for the impulse illuminations of light source 10, very little ambient light is let into the sensor. This allows the invention to image extremely bright objects and scenes under bright ambient illumination. With current technology imaging systems, light from a controlled light source would be overwhelmed by ambient light and would not be detectable at the photosensor.

Also, since the rolling shutter of sensor 15 is aligned solely to the light source 10, reflections and scattered light that are caused by the object (such as if the object was mirrored, shiny, metallic, translucent, etc.) are not captured in the frame. Note that the rolling shutter of sensor 15 can purposely be offset from the source illumination so that only the reflections are captured.

This ability to not image reflections, scattered light and ambient light also gives the invention the ability to image and recover the shape of objects that are in challenging lighting conditions, specifically smoke or mist filled surroundings. Using the source illumination-to-photo-sensor disparity offset can allow for three-dimensional reconstruction within such lighting challenged areas.

It should be understood by one of skill in the art that controller 20 could be implemented as circuitry, as an ASIC, as a microprocessor running software, or by any other means known in the art. The invention is not intended to be limited to one method of implementing the functions of the controller.

Dual photography, a technique where the image generated is from the viewpoint of the light source rather than the photosensor, is also possible, even in a live video context, with no processing required.

The illumination technique used in this invention can be expanded to multiple photosensors. This allows for highly power efficient active illumination stereo using two or more photosensors.

The technique also extends naturally to configurations with multiple light sources. Different light sources interfere with each other minimally when used with the proposed technique. With inter-source synchronization, interference can be eliminated completely.

The proposed technique can be realized with a time-of-flight (ToF) photosensor. A rolling shutter ToF photosensor combined with a modulated scanning laser light source using our technique would allow for a power efficient ToF depth sensor that works under bright ambient light conditions and suppresses indirect lighting effects.

In other embodiments, the invention can be used with other imaging modalities including, but not limited to, light field imaging, microscopy, polarization, coherent, nonlinear, fluorescent and non-linear imaging.

Although the invention is illustrated and described herein with reference to specific embodiments, the invention is not intended to be limited to the details shown. Rather, various modifications may be made in the implementation without departing from the invention.

We claim:

1. A system for capturing images of a scene comprising:
   a directable light source for illuminating a first portion of said scene;
   a sensor configurable for capturing light from a second portion of said scene; and a controller performing the functions of:
- determining said first portion;
- determining said second portion;
- wherein said first portion of said scene and said second portion of said scene are determined to increase the energy transmitted from said directable light source to said sensor while achieving a desired result; and
- temporally synchronizing said directable light source and said sensor;

wherein said scene is composed of an array of pixels;

wherein said directable beam light source is configurable to illuminate only a specific pixel, a line of pixels, or a set of pixels at any given time;

wherein said sensor has a configurable mask to block pixels not within said second portion of said scene; and wherein said pixels to be illuminated are chosen to maximize the total energy transferred from said directable light source to said sensor.

2. The system of claim 1 wherein:
said desired result is represented by a result matrix, said result matrix being the product of a light matrix representing said first portion of said scene and a mask matrix representing said second portion of said scene;

wherein said light matrix and said mask matrix are determined by said controller to maximize the total energy transmitted from said directable light source to said sensor.

3. The system of claim 1 wherein said sensor is configurable to receive light from a specific pixel, a line of pixels or a set of pixels.

4. The system of claim 1 wherein said directable light source is a scanning projector with a beam steering mechanism and further wherein said sensor is a photosensor having a rolling shutter.

5. The system of claim 4 wherein said scanning projector and said photosensor are arranged in a rectified stereo configuration or an approximate rectified stereo configuration.

6. The system of claim 5 wherein said first portion and said second portion are identical.

7. The system of claim 5 wherein said first portion is a line of pixels in said scene and further wherein said photosensor is capable of capturing light from one or more lines of pixels in said scene at any given time.

8. The system of claim 7 wherein said controller performs the functions of:
(a) configuring said directable light source to illuminate one line of pixels in said scene;
(b) configuring said photosensor to capture light from said one or more lines of pixels in said scene; and
(c) repeating steps (a) and (b) until all lines of pixels in said scene have been illuminated and captured.

9. The system of claim 1 wherein said controller performs the functions of:
(a) choosing a first set of pixels in said scene to illuminate;
(b) configuring said directable light source to illuminate only said first set of pixels;
(c) choosing a second set of pixels in said scene from which to capture light; and
(d) configuring said photosensor to capture light from only said second set of pixels; and
(e) repeating steps (a)-(d) until all or a subset of pixels in said scene have been illuminated and captured;

wherein said first set of pixels and said second set of pixels are chosen to optimally achieve said desired result.

10. The system of claim 8 wherein said desired result is selected from a group consisting of live imaging under ambient light, live epipolar and non-epipolar imaging, live short-range and long-range indirect imaging and structured light and active stereo based 3D reconstruction.

11. The system of claim 9 wherein said desired result is selected from a group consisting of live imaging under ambient light, live epipolar and non-epipolar imaging, live short-range and long-range indirect imaging and structured light and active stereo based 3D reconstruction.

12. A method for capturing images of a scene comprising the steps of:
- controlling a directable light source to illuminate a first portion of said scene;
- configuring a sensor to capture light from a second portion of said scene; and
- synchronizing said directable light source and said sensor such that said sensor is configured to capture light from said first portion of said scene only when said directable light source is illuminating said second portion of said scene;

wherein said first portion of said scene and said second portion of said scene are chosen to increase energy transmitted from said directable light source to said sensor while achieving a desired result;

wherein said desired result is represented by a result matrix, said result matrix being the product of a light matrix representing the set of pixels in said portion of said scene to be illuminated and a mask matrix representing said set of pixels in said scene from which light should be captured; and wherein said light matrix and said mask matrix are determined to maximize the total energy transmitted from said directable light source to said sensor.

13. The method of claim 12 wherein said directable light source and said sensor are arranged in a rectified stereo configuration or an approximate rectified stereo configuration.

14. The method of claim 13 wherein said first portion and said second portion are identical.

15. The method of claim 12 wherein said directable light source is capable of illuminating only a specific pixel, a line of pixels, or a set of pixels at any given time.

16. The method of claim 12 wherein said sensor is capable of receiving light from a specific pixel, a line of pixels or a set of pixels.

17. The method of claim 13 wherein said directable light source is a scanning projector with a beam steering mechanism and further wherein said sensor is a photosensor having a rolling shutter.

18. The method of claim 17 wherein said photosensor is capable of capturing light from one or more lines of pixels in said scene at any given time.

19. The method of claim 18 further comprising the steps of:
(a) configuring said light source to illuminate one line of pixels in said scene;
(b) configuring said photosensor to capture light from one or more lines of pixels in said scene, said one or more lines of pixels including said line of illuminated pixels; and
(c) repeating steps (a) and (b) until all or a subset of lines of pixels in said scene have been illuminated and captured.

20. The method of claim 12 further comprising the steps of:
- (a) determining a first set of pixels in said scene to illuminate;
- (b) configuring said directable light source to illuminate said set of pixels;
- (c) determining a second set of pixels in said scene from which to capture light;
- (d) configuring said sensor to capture light from said set of pixels; and
- (e) repeating steps (a)-(d) until all desired portions of said scene have been illuminated and captured;

wherein said first set of pixels and said second set of pixels are chosen to optimally achieve said desired result.

21. The method of claim 19 wherein said desired result is selected from a group consisting of live imaging under ambient light, live epipolar and non-epipolar imaging, live short-range and long-range indirect imaging and structured light and active stereo based 3D reconstruction.

* * * * *